US012193136B2

(12) United States Patent
Lai et al.

(10) Patent No.: US 12,193,136 B2
(45) **Date of Patent: *Jan. 7, 2025**

(54) APPARATUS AND METHOD FOR GENERATING EXTREME ULTRAVIOLET RADIATION

(71) Applicant: TAIWAN SEMICONDUCTOR MANUFACTURING COMPANY, LTD., Hsinchu (TW)

(72) Inventors: Wei-Chih Lai, Changhua County (TW); Han-Lung Chang, Kaohsiung (TW); Chi Yang, Tainan (TW); Shang-Chieh Chien, New Taipei (TW); Bo-Tsun Liu, Taipei (TW); Li-Jui Chen, Hsinchu (TW); Po-Chung Cheng, Chiayi County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,005

(22) Filed: Jul. 19, 2023

(65) Prior Publication Data

US 2023/0363074 A1 Nov. 9, 2023

Related U.S. Application Data

(63) Continuation of application No. 17/322,700, filed on May 17, 2021, now Pat. No. 11,792,909, which is a continuation of application No. 15/906,787, filed on Feb. 27, 2018, now Pat. No. 11,013,097.

(60) Provisional application No. 62/586,392, filed on Nov. 15, 2017.

(51) Int. Cl.
*H05G 2/00* (2006.01)

(52) U.S. Cl.
CPC ............ *H05G 2/006* (2013.01); *H05G 2/008* (2013.01); *H05G 2/005* (2013.01)

(58) Field of Classification Search
None
See application file for complete search history.

(56) References Cited

U.S. PATENT DOCUMENTS 8,796,666 B1 8/2014 Huang et al.
9,078,334 B2 7/2015 Kim et al.
9,093,530 B2 7/2015 Huang et al.
9,184,054 B1 11/2015 Huang et al.
(Continued)

OTHER PUBLICATIONS

Toshihisa Tomie, "Tin laser-produced plasma as the light source for extreme ultraviolet lithography high-volume manufacturing: history, ideal plasma, present status, and prospects", J. Micro/Nanolith. MEMS MOEMS, vol. 11, No. 2, (Apr.-Jun. 2012), pp. 021109-1-021109-9.

(Continued)

*Primary Examiner* — Eliza W Osenbaugh-Stewart
(74) *Attorney, Agent, or Firm* — STUDEBAKER & BRACKETT PC

(57) ABSTRACT

A target droplet source for an extreme ultraviolet (EUV) source includes a droplet generator configured to generate target droplets of a given material. The droplet generator includes a nozzle configured to supply the target droplets in a space enclosed by a chamber. The target droplet source further includes a sleeve disposed in the chamber distal to the nozzle. The sleeve is configured to provide a path for the target droplets in the chamber.

20 Claims, 8 Drawing Sheets

(56) References Cited

U.S. PATENT DOCUMENTS

| | | | |
|---|---|---|---|
| 9,256,123 | B2 | 2/2016 | Shih et al. |
| 9,529,268 | B2 | 12/2016 | Chang et al. |
| 9,548,303 | B2 | 1/2017 | Lee et al. |
| 9,618,837 | B2 | 4/2017 | Lu et al. |
| 9,869,928 | B2 | 1/2018 | Huang et al. |
| 9,869,934 | B2 | 1/2018 | Huang et al. |
| 9,869,939 | B2 | 1/2018 | Yu et al. |
| 2005/0199829 | A1 | 9/2005 | Partlo et al. |
| 2006/0186356 | A1 | 8/2006 | Imai et al. |
| 2010/0053581 | A1 | 3/2010 | Swinkels et al. |
| 2011/0248191 | A1 | 10/2011 | Fomenkov et al. |
| 2012/0019826 | A1 | 1/2012 | Graham et al. |
| 2012/0280149 | A1 | 11/2012 | Mestrom et al. |
| 2016/0054663 | A1 | 2/2016 | Kleemans et al. |
| 2016/0143122 | A1 | 5/2016 | Heo et al. |
| 2016/0274467 | A1 | 9/2016 | Schimmel et al. |
| 2016/0377985 | A1 | 12/2016 | Nienhuys |

OTHER PUBLICATIONS

David C. Brandt et al., "LPP Source System Development for HVM", Proc. of SPIE—The International Society for Optical Engineering, Mar. 2010, vol. 7271, pp. 727103-1-727103-10.

Non-Final Office Action issued in U.S. Appl. No. 15/906,787, dated Apr. 2, 2019.

Final Office Action issued in U.S. Appl. No. 15/906,787, dated Aug. 8, 2019.

Non-Final Office Action issued in U.S. Appl. No. 15/906,787, dated Dec. 10, 2019.

Final Office Action issued in U.S. Appl. No. 15/906,787, dated Jun. 25, 2020,.

Notice of Allowance issued in U.S. Appl. No. 15/906,787, dated Nov. 23, 2020.

Non-Final Office Action issued in U.S. Appl. No. 17/322,700, dated Jun. 17, 2022.

Final Office Action issued in U.S. Appl. No. 17/322,700, dated Jan. 4, 2023.

Notice of Allowance issued in U.S. Appl. No. 17/322,700, dated Jun. 8, 2023.

APPARATUS AND METHOD FOR GENERATING EXTREME ULTRAVIOLET RADIATION

RELATED APPLICATIONS

This application is a continuation application of U.S. patent application Ser. No. 17/322,700 filed May 17, 2021, now U.S. Pat. No. 11,792,909, which is a continuation application of U.S. patent application Ser. No. 15/906,787 filed Feb. 27, 2018 now U.S. Pat. No. 11,013,097, which claims priority to U.S. provisional application No. 62/586,392, filed Nov. 15, 2017, the entire contents of each of which are incorporated herein by reference.

TECHNICAL FIELD

This disclosure relates to methods and apparatus for generating extreme ultraviolet (EUV) radiation, particularly EUV radiation used in semiconductor manufacturing processes.

BACKGROUND

The demand for computational power has increased exponentially. This increase in computational power is met by increasing the functional density, i.e., number of interconnected devices per chip, of semiconductor integrated circuits (ICs). With the increase in functional density, the size of individual devices on the chip has decreased. The decreasing size of components in ICs has been met with advancements in semiconductor manufacturing techniques such as lithography.

For example, the wavelength of radiation used for lithography has decreased from ultraviolet to deep ultraviolet (DUV) and, more recently to extreme ultraviolet (EUV). Further decreases in component size require further improvements in resolution of lithography which are achievable using extreme ultraviolet lithography (EUVL). EUVL employs radiation having a wavelength of about 1-100 nm.

One method for producing EUV radiation is laser-produced plasma (LPP). In an LPP based EUV source a high-power laser beam is focused on small tin droplet targets to form highly ionized plasma that emits EUV radiation with a peak maximum emission at 13.5 nm. The intensity of the EUV radiation produced by LPP depends on the effectiveness with which the high-powered laser can produce the plasma from the target droplets. Availability of a steady stream of target droplets having the same diameter and arriving at a fixed period can improve the efficiency of an LPP based EUV radiation source.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
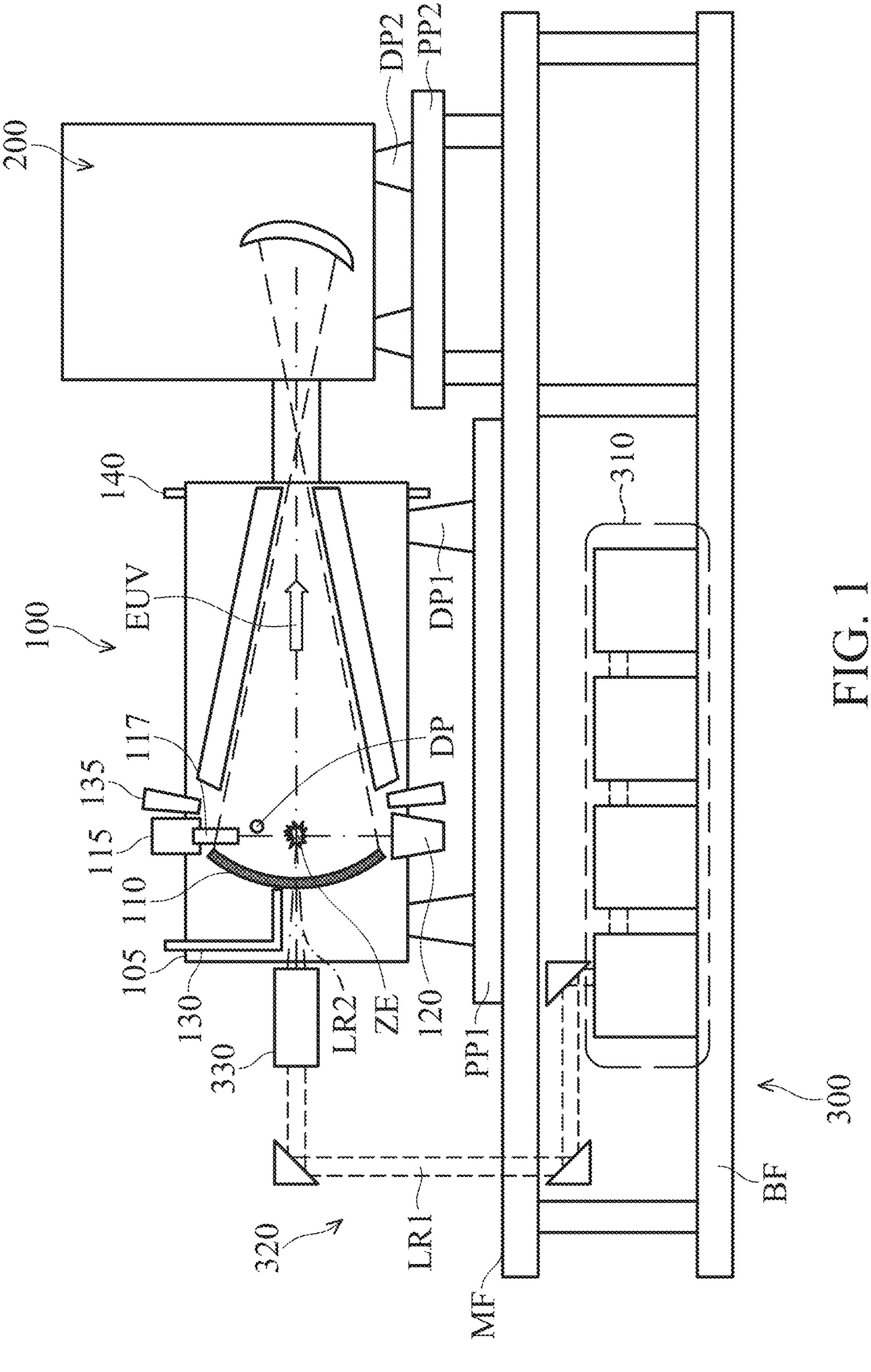
FIG. 1 is a schematic view of an EUV lithography system with a laser production plasma (LPP) EUV radiation source, constructed in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus/device may be otherwise oriented (rotated 90 degrees or at other orientations) and the spatially relative descriptors used herein may likewise be interpreted accordingly. In addition, the term "made of" may mean either "comprising" or "consisting of."

The present disclosure is generally related to extreme ultraviolet (EUV) lithography systems and methods. More particularly, it is related to apparatuses and methods for producing target droplets used in a laser produced plasma (LPP) based EUV radiation source. In an LPP based EUV radiation source, an excitation laser heats metal (e.g., tin, lithium, etc.) target droplets in the LPP chamber to ionize the droplets to plasma which emits the EUV radiation. For reproducible generation of EUV radiation, the target droplets arriving at the focal point (also referred to herein as the "zone of excitation") have to be substantially the same size and arrive at the zone of excitation at the same time as an excitation pulse from the excitation laser arrives. Thus, stable generation of target droplets that travel from the target droplet generator to the zone of excitation at a uniform (or predictable) speed contributes to efficiency and stability of the LPP EUV radiation source. One of the objectives of the present disclosure is directed to generating target droplets and providing a path along which the target droplets can travel at a uniform speed and without a change in their size or shape.

FIG. 1 is a schematic view of an EUV lithography system with a laser production plasma (LPP) based EUV radiation source, constructed in accordance with some embodiments of the present disclosure. The EUV lithography system includes an EUV radiation source 100 to generate EUV radiation, an exposure tool 200, such as a scanner, and an excitation laser source 300. As shown in FIG. 1, in some embodiments, the EUV radiation source 100 and the exposure tool 200 are installed on a main floor MF of a clean room, while the excitation laser source 300 is installed in a base floor BF located under the main floor. Each of the EUV radiation source 100 and the exposure tool 200 are placed over pedestal plates PP1 and PP2 via dampers DP1 and DP2, respectively. The EUV radiation source 100 and the exposure tool 200 are coupled to each other by a coupling mechanism, which may include a focusing unit.

The lithography system is an EUV lithography system designed to expose a resist layer by EUV light (also interchangeably referred to herein as EUV radiation). The resist layer is a material sensitive to the EUV light. The EUV lithography system employs the EUV radiation source 100 to generate EUV light, such as EUV light having a wavelength ranging between about 1 nm and about 100 nm. In one particular example, the EUV radiation source 100 generates an EUV light with a wavelength centered at about 13.5 nm. In the present embodiment, the EUV radiation source 100 utilizes a mechanism of laser-produced plasma (LPP) to generate the EUV radiation.

The exposure tool 200 includes various reflective optic components, such as convex/concave/flat mirrors, a mask holding mechanism including a mask stage, and wafer holding mechanism. The EUV radiation EUV generated by the EUV radiation source 100 is guided by the reflective optical components onto a mask secured on the mask stage. In some embodiments, the mask stage includes an electrostatic chuck (e-chuck) to secure the mask.

Because gas molecules absorb EUV light, the lithography system for the EUV lithography patterning is maintained in a vacuum or a-low pressure environment to avoid EUV intensity loss.

In the present disclosure, the terms mask, photomask, and reticle are used interchangeably. In the present embodiment, the mask is a reflective mask. In an embodiment, the mask includes a substrate with a suitable material, such as a low thermal expansion material or fused quartz. In various examples, the material includes $TiO_2$ doped $SiO_2$, or other suitable materials with low thermal expansion. The mask includes multiple reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configured to highly reflect the EUV light. The mask may further include a capping layer, such as ruthenium (Ru), disposed on the ML for protection. The mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

The exposure tool 200 includes a projection optics module for imaging the pattern of the mask on to a semiconductor substrate with a resist coated thereon secured on a substrate stage of the exposure tool 200. The projection optics module generally includes reflective optics. The EUV radiation (EUV light) directed from the mask, carrying the image of the pattern defined on the mask, is collected by the projection optics module, thereby forming an image onto the resist.

In various embodiments of the present disclosure, the semiconductor substrate is a semiconductor wafer, such as a silicon wafer or other type of wafer to be patterned. The semiconductor substrate is coated with a resist layer sensitive to the EUV light in presently disclosed embodiments. Various components including those described above are integrated together and are operable to perform lithography exposing processes.

The lithography system may further include other modules or be integrated with (or be coupled with) other modules.

As shown in FIG. 1, the EUV radiation source 100 includes a target droplet generator 115 and a LPP collector 110, enclosed by a chamber 105. In various embodiments, the target droplet generator 115 includes a reservoir (not shown) to hold a source material and a nozzle 117 through which target droplets DP of the source material are supplied into the chamber 105.

In some embodiments, the target droplets DP are droplets of tin (Sn), lithium (Li), or an alloy of Sn and Li. In some embodiments, the target droplets DP each have a diameter in a range from about 10 microns (μm) to about 100 μm. For example, in an embodiment, the target droplets DP are tin droplets, each having a diameter of about 10 μm, about 25 μm, about 50 μm, or any diameter between these values. In some embodiments, the target droplets DP are supplied through the nozzle 117 at a rate in a range from about 50 droplets per second (i.e., an ejection-frequency of about 50 Hz) to about 50,000 droplets per second (i.e., an ejection-frequency of about 50 kHz). For example, in an embodiment, target droplets DP are supplied at an ejection-frequency of about 50 Hz, about 100 Hz, about 500 Hz, about 1 kHz, about 10 kHz, about 25 kHz, about 50 kHz, or any ejection-frequency between these frequencies. The target droplets DP are ejected through the nozzle 117 and into a zone of excitation ZE at a speed in a range of about 10 meters per second (m/s) to about 100 m/s in various embodiments. For example, in an embodiment, the target droplets DP have a speed of about 10 m/s, about 25 m/s, about 50 m/s, about 75 m/s, about 100 m/s, or at any speed between these speeds.

In various embodiments, the nozzle 117 is maintained at a certain temperature that is usually higher than the melting point of the source material. However, under certain conditions such as, for example, if the chamber 105 is to be vented for a service or if there is an unscheduled change in temperature of the chamber 105, temperature of the nozzle 117 is reduced to below the melting point of the source material, e.g, tin. When the nozzle 117 cools down, there is a high likelihood of leakage in the liquid source material through the nozzle increases because of possible particulate formation at the nozzle 117. Moreover, such leaked source material typically gets deposited on the collector 110 resulting in reduction in the reflectivity of the collector 110. This in turn results in the loss of stability and efficiency of the EUV radiation source 100. In some cases, replacement of the collector 110 may be required, leading to unnecessary and avoidable expense as well as down-time for the entire lithography system.

Referring back to FIG. 1, the excitation laser LR2 generated by the excitation laser source 300 is a pulse laser. The laser pulses LR2 are generated by the excitation laser source 300. The excitation laser source 300 may include a laser generator 310, laser guide optics 320 and a focusing apparatus 330. In some embodiments, the laser source 310 includes a carbon dioxide ($CO_2$) or a neodymium-doped yttrium aluminum garnet (Nd:YAG) laser source with a wavelength in the infrared region of the electromagnetic spectrum. For example, the laser source 310 has a wavelength of 9.4 μm or 10.6 μm, in an embodiment. The laser light LR1 generated by the laser generator 300 is guided by the laser guide optics 320 and focused into the excitation laser LR2 by the focusing apparatus 330, and then introduced into the EUV radiation source 100.

In some embodiments, the excitation laser LR2 includes a pre-heat laser and a main laser. In such embodiments, the pre-heat laser pulse (interchangeably referred to herein as the "pre-pulse) is used to heat (or pre-heat) a given target droplet to create a low-density target plume with multiple smaller droplets, which is subsequently heated (or reheated) by a pulse from the main laser, generating increased emission of EUV light.

In various embodiments, the pre-heat laser pulses have a spot size about 100 μm or less, and the main laser pulses have a spot size in a range of about 150 μm to about 300 μm. In some embodiments, the pre-heat laser and the main laser pulses have a pulse-duration in the range from about 10 ns to about 50 ns, and a pulse-frequency in the range from about 1 kHz to about 100 kHz. In various embodiments, the pre-heat laser and the main laser have an average power in the range from about 1 kilowatt (kW) to about 50 kW. The pulse-frequency of the excitation laser LR2 is matched with the ejection-frequency of the target droplets DP in an embodiment.

The laser light LR2 is directed through windows (or lenses) into the zone of excitation ZE. The windows adopt a suitable material substantially transparent to the laser beams. The generation of the pulse lasers is synchronized with the ejection of the target droplets DP through the nozzle 117. As the target droplets move through the excitation zone, the pre-pulses heat the target droplets and transform them into low-density target plumes. A delay between the pre-pulse and the main pulse is controlled to allow the target plume to form and to expand to an optimal size and geometry. In various embodiments, the pre-pulse and the main pulse have the same pulse-duration and peak power. When the main pulse heats the target plume, a high-temperature plasma is generated. The plasma emits EUV radiation EUV, which is collected by the collector mirror 110. The collector 110 further reflects and focuses the EUV radiation for the lithography exposing processes performed through the exposure tool 200. The droplet catcher 120 is used for catching excessive target droplets. For example, some target droplets may be purposely missed by the laser pulses.

The high-temperature plasma generated when a target droplet is hit with the main pulse exerts a high outward pressure. The next target droplet must travel through a strong wind of plasma generated by the previous target droplet. Without wishing to be bound by theory, the momentum given by the plasma to the next target droplet is given by $$m V_{exp} S \mathrm{L} n_o (r_o/L)^3 = (3/4\pi) M V_{exp} S/L^2 \quad \text{Expression (1).}$$

Where the plasma is assumed to have a uniform density profile with the initial density and radius being denoted by $n_o$ and $r_o$ respectively, m and $V_{exp}$ are the mass and expansion velocity of ions in the plasma, S is the cross-section of the travelling droplet, L is the separation between the successive droplets, and M is the mass the target droplet hit by the main pulse. In an embodiment, $V_{exp}$ for the plasma is about $3.5\times10^4$ m/s, and $r_o$ is about 15 μm. In various embodiments, L is in a range from about 0.5 mm to about 3 mm depending on the ejection frequency and speed of the target droplets.

Referring back to FIG. 1, the collector 110 is designed with a proper coating material and shape to function as a mirror for EUV collection, reflection, and focusing. In some embodiments, the collector 110 is designed to have an ellipsoidal geometry. In some embodiments, the coating material of the collector 100 is similar to the reflective multilayer of the EUV mask. In some examples, the coating material of the collector 110 includes a ML (such as a plurality of Mo/Si film pairs) and may further include a capping layer (such as Ru) coated on the ML to substantially reflect the EUV light. In some embodiments, the collector 110 may further include a grating structure designed to effectively scatter the laser beam directed onto the collector 110. For example, a silicon nitride layer is coated on the collector 110 and is patterned to have a grating pattern.

In such an EUV radiation source, the plasma caused by the laser application creates physical debris, such as ions, gases and atoms of the droplet, as well as the desired EUV radiation. It is necessary to prevent the accumulation of material on the collector 110 and also to prevent physical debris exiting the chamber 105 and entering the exposure tool 200.

As shown in FIG. 1, in the present embodiment, a buffer gas is supplied from a first buffer gas supply 130 through the aperture in collector 110 by which the pulse laser is delivered to the tin droplets. In some embodiments, the buffer gas is $H_2$, He, Ar, N or another inert gas. In certain embodiments, $H_2$ is used as H radicals generated by ionization of the buffer gas can be used for cleaning purposes. The buffer gas can also be provided through one or more second buffer gas supplies 135 toward the collector 110 and/or around the edges of the collector 110. Further, the chamber 105 includes one or more gas outlets 140 so that the buffer gas is exhausted outside the chamber 105.

Hydrogen gas has low absorption to the EUV radiation. Hydrogen gas reaching to the coating surface of the collector 110 reacts chemically with a metal of the droplet forming a hydride, e.g., metal hydride. When tin (Sn) is used as the droplet, stannane ($SnH_4$), which is a gaseous byproduct of the EUV generation process, is formed. The gaseous $SnH_4$ is then pumped out through the outlet 140.

The combination of the pressure exerted by the plasma flow and the flow of the buffer (e.g., $H_2$) gas in the chamber 105 alters the path of target droplets following the target droplet that produced the plasma. Any alteration in the path of target droplets in results inefficient heating of the target droplets which may adversely affect the performance of the EUV radiation source. Other potential effects of alteration in the path of target droplets include, but are not limited to, deposition of debris on the collector mirror and contamination the of exposure tool.

Figure 2:
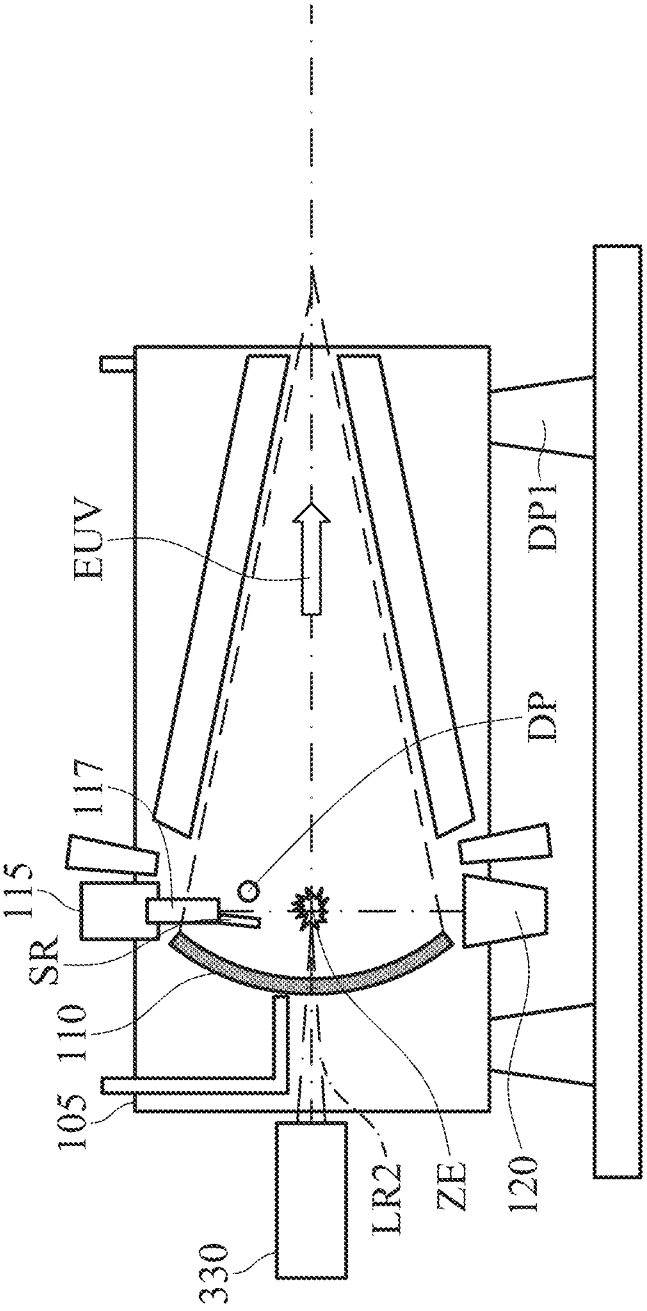
FIG. 2 schematically illustrates a shroud used to prevent flow of source material on the collector because of leakage from the droplet generator, in accordance with an embodiment of the present disclosure.

FIG. 2 schematically illustrates a shroud SR used to prevent flow of source material on the collector because of leakage from the droplet generator, in accordance with an embodiment of the present disclosure. In an embodiment, a shroud SR is provided proximal to the nozzle 117 and disposed between the droplet generator 115 and the collector 110. The shroud SR extends in the direction of the path of travel of the target droplets. In an embodiment, the shroud SR is a longitudinally open tube of which the closed portion is between the collector 110 and the target droplets. In various embodiments, the shroud SR is formed of a material which is does not react with either the material of the target droplets (e.g., tin) or the buffer gas. Examples of materials that can be used for the shroud SR include, but are not limited to a ceramic, molybdenum, or stainless steel. The cross-section of the shroud SR is not particularly limited. In an embodiment, the shroud SR has an open cross-section, such as for example, a generally C-shaped (i.e., semicircular) cross-section or a U-shaped cross-section. Likewise, the length of the shroud SR is not particularly limited. The length is limited by the distance between the nozzle 117 and the zone of excitation ZE, and is chosen, in various embodiments, so as not to limit the expansion of plasma generated after a main pulse LR2 hits a target DP.

While the shroud SR is effective in preventing particles of the source material (e.g., tin) from traveling towards the collector 110 because of leakage of the source material from the droplet generator 115, the shroud SR does not shield the target droplets themselves.

Figure 3A:
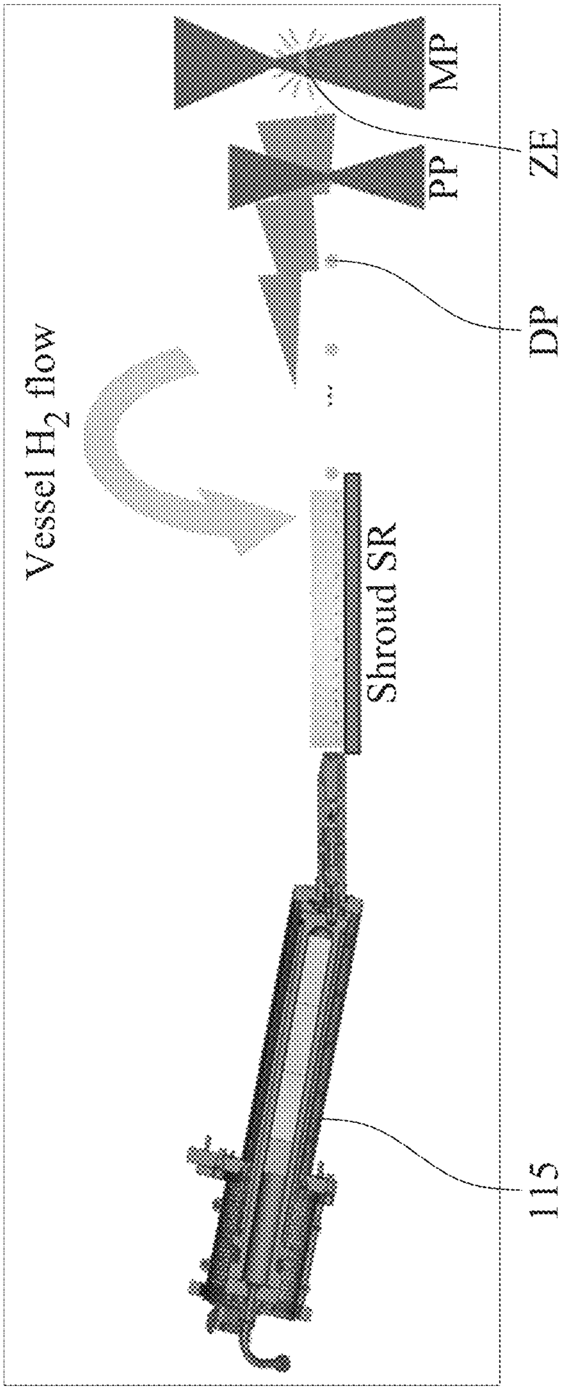
FIG. 3A schematically illustrates the effect of plasma expansion and buffer gas flow on the travel path of target droplets.
Figure 3B:
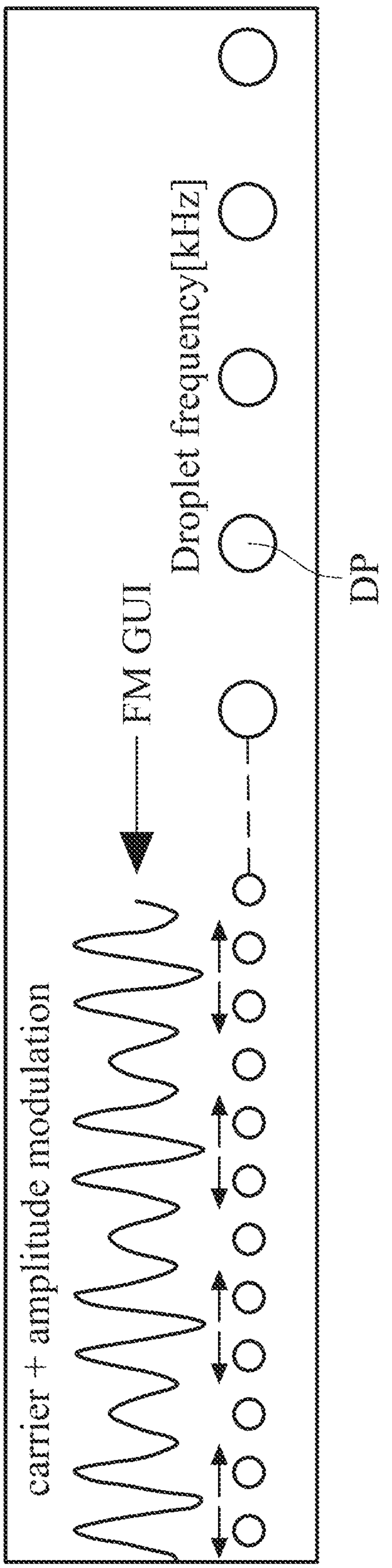
FIG. 3B schematically illustrates the effect of plasma expansion and buffer gas flow on frequency of the target droplets.

FIG. 3A schematically illustrates the effect of plasma expansion and buffer gas flow on the travel path of target droplets, and FIG. 3B schematically illustrates the effect of plasma expansion and buffer gas flow on the frequency of the target droplets. As discussed elsewhere herein, Expression (1) provides the reduction in momentum of a target droplet because of the pressure exerted by plasma generated from the immediately preceding target droplet. In addition, the momentum of the target droplet also changes as the flow of buffer gas changes because of the plasma. Depending on the ejection frequency of the target droplets from the nozzle 117, momentum of one or more target droplets may be affected by the pressure exerted by the plasma in certain conditions, and under particular conditions, successive target molecules may be affected sufficiently to coalesce. Further, because of the presence of the buffer gas, the shockwave produced from plasma expansion propagates through the chamber 105 and is reflected from the chamber walls. The resulting shock wave modulates the ejection frequency of the target droplets supplied by the nozzle 117 as can be seen in FIG. 3B.

Target droplet coalescence as well as modulation of the ejection frequency of the target droplets results in target droplets arriving at the zone of excitation earlier or later than the excitation pulse LR2 (either pre-pulse or main pulse or both). The result of early or delayed arrival of the target droplets DP at the zone of excitation ZE compared to the excitation pulse results in a reduction in stability, output power and conversion efficiency of the EUV radiation source 100.

Figure 4:
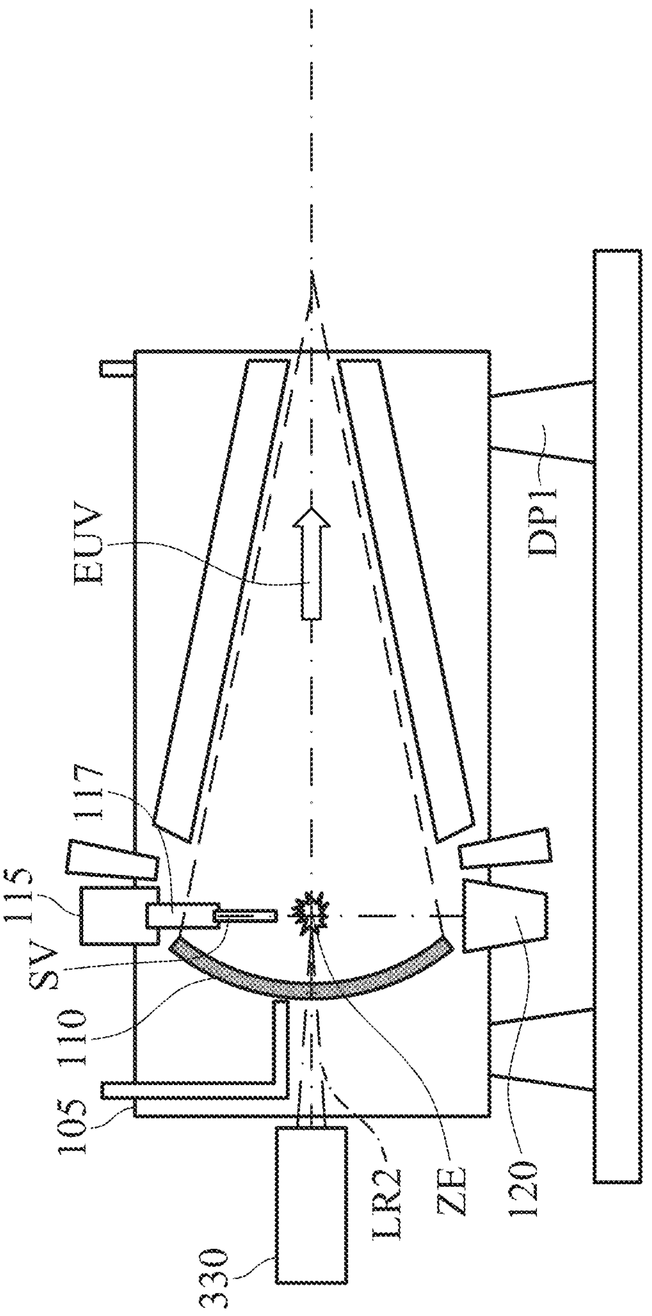
FIG. 4 schematically illustrates EUV radiation source having an enclosed sleeve for the target droplets, in accordance with an embodiments of the present disclosure.
Figure 5A:
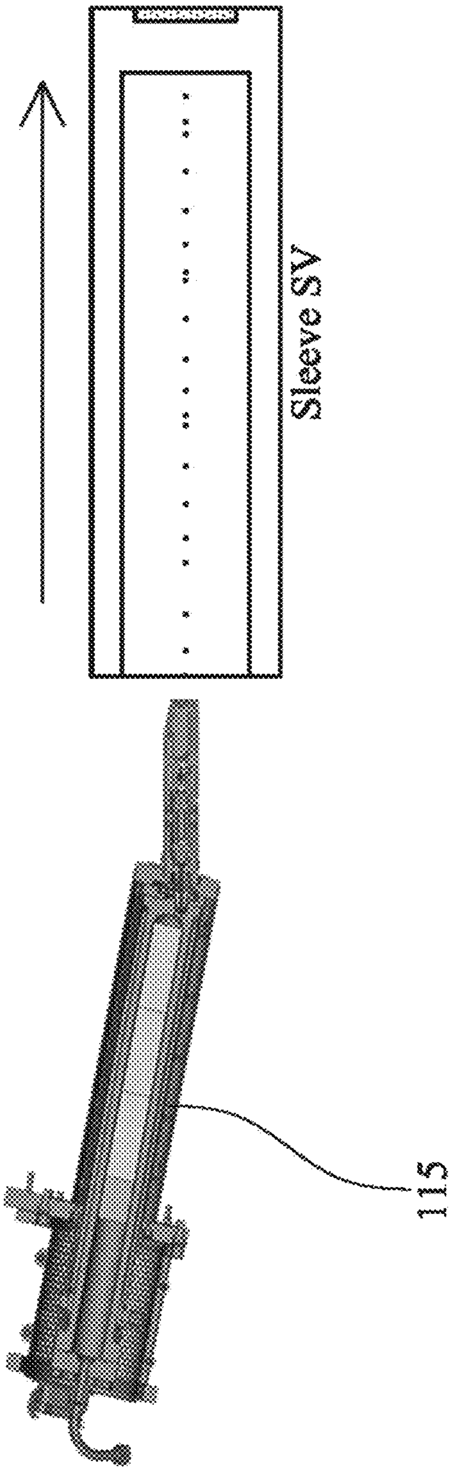
FIG. 5A schematically illustrates an embodiment of the sleeve enclosing the path of travel of the target droplets, in accordance with the present disclosure.

One of the ways to reduce the effect of plasma pressure and buffer gas flow on the target droplets is to shield the target droplets from the shockwave discussed elsewhere herein. FIG. 4 schematically illustrates EUV radiation source having an enclosed sleeve for the target droplets, in accordance with an embodiments of the present disclosure. FIG. 5A schematically illustrates the sleeve enclosing the path of travel of the target droplets, in accordance with an embodiment of the present disclosure.

In an embodiment, a tubular sleeve SV is provided proximal to the nozzle 117 and extending longitudinally along the path of the target droplets. In some embodiments, the sleeve SV is disposed similarly to the shroud SR shown in FIG. 2, and encloses the path of travel of the target droplets along the length of the sleeve SV.

As with the shroud SR, in various embodiments, the sleeve SV is formed of a material which is does not react with either the material of the target droplets (e.g., tin) or the buffer gas. Examples of materials that can be used for the sleeve SV include, but are not limited to ceramic, molybdenum, a molybdenum alloy, a molybdenum comprising material, or stainless steel.

The cross-section of the sleeve SV is not particularly limited so long as it is a closed shape. For example, in an embodiment, the shape of cross-section of the sleeve SV is a circle, an ellipse, a triangle, and a regular or irregular convex polygon. In some embodiments, the sleeve SV has a wall-thickness in a range of about 0.2 cm to about 1 cm. The area of cross-section of the sleeve SV, i.e., the area enclosed by the inner walls of the sleeve SV, is in a range of about 5 $cm^2$ to about 25 $cm^2$ depending on the design of the EUV radiation source in various embodiments. In some embodiments, the sleeve SV has a cross-section area that reduces distally from the droplet generator 115 in the direction of the zone of excitation ZE. In other words, the sleeve SV has longitudinally tapering inner cross-section (see FIG. 5C). For example, in an embodiment where the sleeve SV has a circular the cross-section, diameter of a proximal aperture of the sleeve SV, i.e., aperture at the end closer to the droplet generator, is about 2 cm, and diameter of a distal aperture of the sleeve SV, i.e., aperture at the end away from the droplet generator DP, is about 1 cm.

Likewise, the length of the sleeve SV is not particularly limited. The length is limited by the distance between the nozzle 117 and the zone of excitation ZE, and is chosen, in various embodiments, so as not to limit the expansion of plasma generated after a main pulse LR2 hits a target DP. For example, the length of the sleeve SV is in a range from about 5 cm to about 35 cm depending on the design of the EUV radiation source.

Disposing the sleeve SV to enclose the path of travel of the target droplets DP reduces the effect of buffer gas flow and plasma pressure on the target droplets DP such that characteristics of the target droplets are substantially unaffected because of a change in the environment of the chamber 105. As used herein, the term "substantially unaffected" refers to a situation where a given characteristic of a given target droplet does not deviate more than about 10% from its designed value. For example, in an embodiment, target droplets are designed to have a diameter of about 30 μm through the chamber when they are ejected from the nozzle. The diameter of the target droplets is said to be substantially unaffected if the change in the diameter is less than about 3 μm. In other words, a target droplet having a diameter in a range of about 27 μm to about 33 μm is a target droplet that has not substantially changed in diameter as it travels through the chamber 105. In various embodiments, the characteristics of target droplets include, but are not limited to, a velocity of the target droplets, a distance between successive target droplets, a travel path or axis of the target droplets, a frequency of the target droplets, a radius of the target droplets and a shape of the target droplets. In various embodiments, a change in chamber environment includes a change in parameters such as, for example, a pressure inside the EUV generation chamber, a temperature inside the EUV generation chamber, a flow rate of gas inside the EUV generation chamber, and a local pressure at a portion of the space enclosed by the EUV generation chamber.

Those skilled in the art will appreciate that while FIG. 5A shows the sleeve SV being in contact with the nozzle 117, such a configuration is not necessary. For example, the proximal end of the sleeve near the droplet generator 115 is separated by a fixed distance from the nozzle 117 in some embodiments. In such embodiments, an attachment member (not shown) secures the sleeve SV in a particular position. In such an embodiment, while there is a possibility that the attachment member hinders the optical patch of EUV radiation reflected from the collector 110, the distance separation between the nozzle 117 and the sleeve SV can be used to perform metrology analysis on the target droplets. For example, an optical probe (e.g., a combination of a radiation source such as a low power laser and a photodiode) is used to measure the speed and diameter of the target droplets supplied from the nozzle 117 before they enter the sleeve SV. Other metrology analysis of target droplets includes, without limitation, measuring the path or direction of travel of the target droplets, distance between successive target droplets, frequency of the target droplets, shape of the target droplets, etc.

Figure 5B:
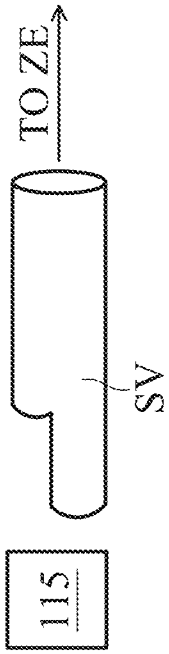
FIG. 5B schematically illustrates an alternative embodiment of the sleeve enclosing the path of travel of the target droplets, in accordance with the present disclosure.
Figure 5C:
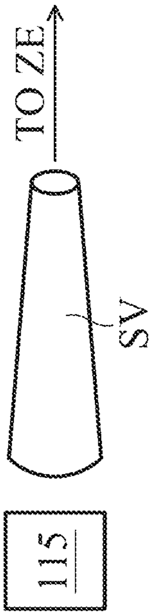
FIG. 5C schematically illustrates another embodiment of the sleeve enclosing the path of travel of the target droplets, in accordance with the present disclosure.
Figure 5D:
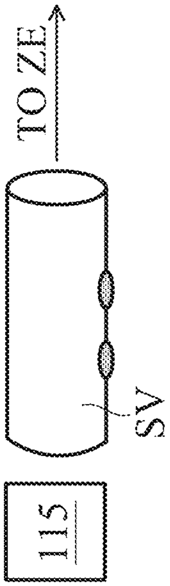
FIG. 5D schematically illustrates yet another embodiment of the sleeve enclosing the path of travel of the target droplets, in accordance with the present disclosure.

FIGS. 5B-D schematically illustrate various embodiments of the sleeve enclosing the path of travel of the target droplets, in accordance with the present disclosure. In an embodiment, illustrated in FIG. 5B, a portion of the sleeve SV proximal to the nozzle 117 has an open cross-section similar to that of shroud SR, while a portion of the sleeve SV distal to the nozzle 117 has the closed cross-section disclosed herein. While such hybrid configuration for the sleeve does not provide an enclosed path for the target droplets all the way from the droplet generator, the portion of the path of target droplets most vulnerable to plasma pressure is enclosed in this configuration. However, such a hybrid configuration saves material for the sleeve SV and also provides a location for performing metrology analysis on the target droplets as discussed elsewhere herein. The open portion of the sleeve proximal to the nozzle 117, in such embodiments, provides access for one or more light beams to illuminate the target droplets exiting the nozzle 117.

In another embodiment, illustrated in FIG. 5C, the sleeve SV has a tapered cross-section, narrowing from the proximal end. In some embodiments, illustrated in FIG. 5D, one or more (two illustrated in FIG. 5D) optical probes are embedded within the wall of the sleeve SV. An optical probe includes, for example, a semiconductor laser directed to focus at a point along the path of travel of the target droplets, and a photodiode configured to detect light from the semiconductor laser scattered by the target droplets traveling along the path provided by the sleeve SV.

In yet other embodiments, the sleeve SV is similar in shape and positioning to one illustrated in FIG. 5A, but is made of a transparent material such as, for example, fused quartz or diamond to allow metrology analysis of the target droplets using optical probes as discussed elsewhere herein.

Figure 6:
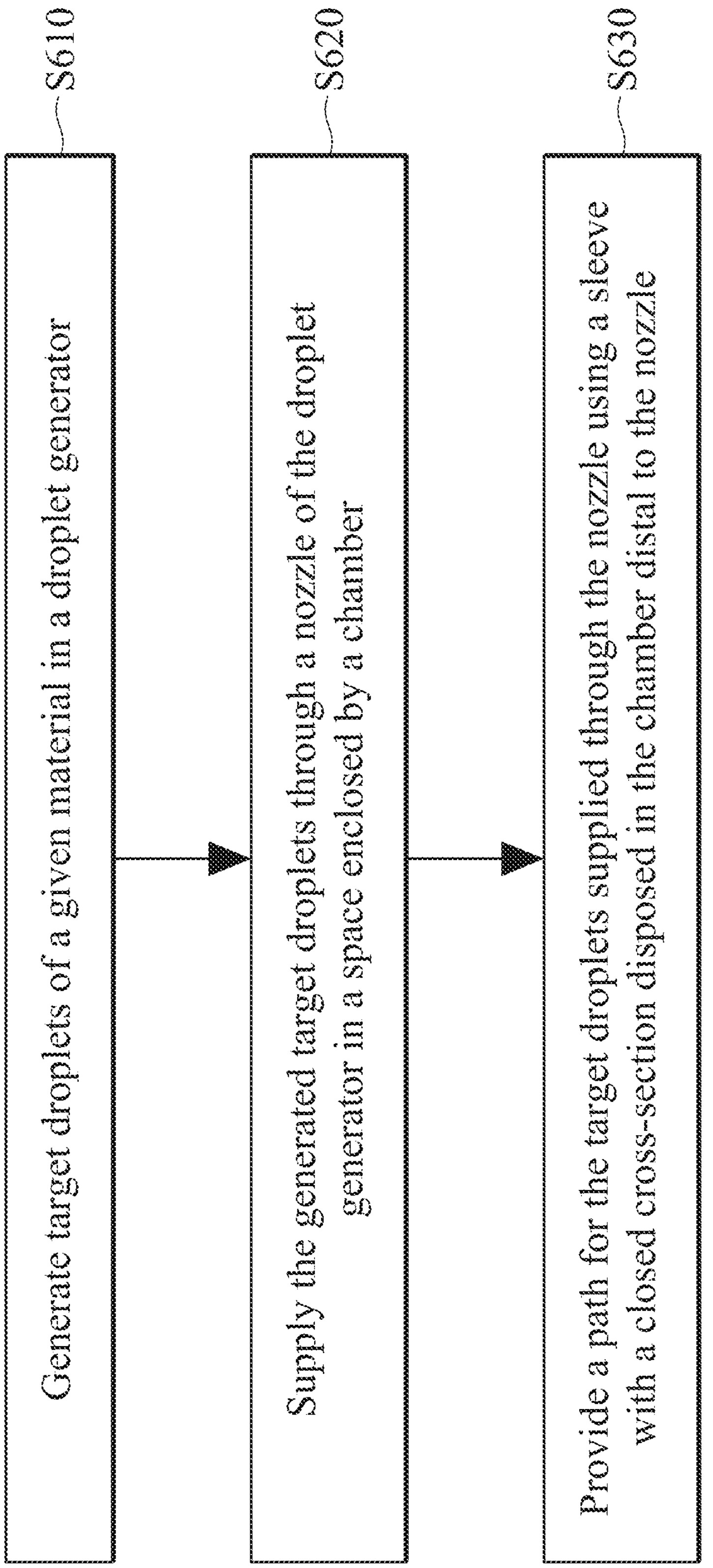
FIG. 6 illustrates a flow-chart for a method of producing target droplets for generating laser produced plasma in an EUV radiation source, in accordance with an embodiment of the present disclosure.

FIG. 6 illustrates a flow-chart for a method of producing target droplets for generating laser produced plasma in an EUV radiation source, in accordance with an embodiment of the present disclosure. In an embodiment, the method includes, at S610, generating target droplets of a given source material in a droplet generator. In various embodiments, the material of the target droplets is one of tin, lithium or an alloy of tin and lithium.

The method further includes, at S620, supplying the generated target droplets through a nozzle of the droplet generator in a space enclosed by a chamber. In some embodiments, the nozzle of the target droplet is maintained at a temperature higher than the melting point of the source material.

The method further includes, at S630, providing an enclosed path for the target droplets supplied through the nozzle using a sleeve disposed in the chamber proximal to the nozzle such that a characteristic of the target droplets along the path provided by the sleeve is substantially unaffected by a variation of environment within the chamber. As used herein, the term "substantially unaffected" refers to a situation where a given characteristic of a given target droplet does not deviate more than about 10% from its designed value. Examples of characteristics of the target droplet include, without limitation, a velocity of the target droplets, a distance between successive target droplets, a frequency of the target droplets, a radius of the target droplets, a shape of the target droplets, or any combination thereof. A variation of environment within the chamber, in various embodiments, includes, but is not limited to, a change in: a pressure inside the EUV generation chamber, a temperature inside the EUV generation chamber, a flow rate of gas inside the EUV generation chamber, a local pressure at a portion of the space enclosed by the EUV generation chamber, or any combination thereof.

In various embodiments, the sleeve is formed of a material which is does not react with either the material of the target droplets or the buffer gas. Examples of materials that can be used for the sleeve include, but are not limited to ceramic, molybdenum, a molybdenum alloy, a molybdenum comprising material, or stainless steel. In various embodiments, the sleeve has a closed cross-section with a shape such as, for example, a circle, an ellipse, a triangle, and a regular or irregular convex polygon. In some embodiments, the area of enclosed by the cross-section of the sleeve is in a range from about 5 $cm^2$ to about 25 $cm^2$ depending on the design of the EUV radiation source. The length of the sleeve, in some embodiments, is in a range from about 5 cm to about 35 cm depending on the design of the EUV radiation source. In an embodiment, the sleeve has a longitudinally tapering inner cross-section.

It will be understood that not all advantages have been necessarily discussed herein, no particular advantage is required for all embodiments or examples, and other embodiments or examples may offer different advantages.

In the present disclosure, by providing a path for target droplets traveling from a nozzle of a target droplet generator to a zone of excitation through a sleeve with a closed cross-section, the effect of plasma and buffer gas flow on the size, shape and travel path of the target droplets can be reduced. Therefore, quality of target droplets arrive at the zone of excitation is improved, and in turn the performance of the EUV radiation source can be improved. Additionally, collector contamination caused by target droplet instability or by leakage of source material from the target droplet generator can be reduced.

According to one aspect of the present disclosure, an extreme ultraviolet (EUV) radiation source includes an EUV generation chamber enclosing a space, a droplet generator and an excitation laser. The droplet generator is configured to generate target droplets of a given material. The droplet generator includes a nozzle configured to supply the target droplets in the space enclosed by the EUV generation chamber. The excitation laser is configured to heat the target droplets supplied by the nozzle to generate plasma. The excitation laser is focused at a focal position in the space enclosed by the EUV generation chamber. The EUV radiation source further includes a sleeve disposed in the EUV generation chamber between the nozzle and the focal position. The sleeve is configured to provide a path for the target droplets between the nozzle and the focal position. A characteristic of the target droplets along the path provided by the sleeve is substantially unaffected by a variation of environment within the EUV generation chamber. In one or more of the foregoing and following embodiments, the characteristic of the target droplets is one or more selected from the group consisting of a velocity of the target droplets, a distance between successive target droplets, a frequency of the target droplets, a radius of the target droplets and a shape of the target droplets. In an embodiment, the environment within the EUV generation chamber includes one or more selected from the group consisting of a pressure inside the EUV generation chamber, a temperature inside the EUV generation chamber, a flow rate of gas inside the EUV generation chamber, and a local pressure at a portion of the space enclosed by the EUV generation chamber. In some embodiments, the sleeve comprises a tubular body. In an embodiment, the sleeve has a cross-section having a closed shape. In an embodiment, the closed shape is selected from the group consisting of a circle, an ellipse, a triangle, and a regular or irregular convex polygon. In some embodiments, the sleeve is made of stainless steel, a ceramic, or a material comprising molybdenum. In an embodiment, the sleeve has a longitudinally tapering cross-section.

According to another aspect of the present disclosure, a target droplet source for an extreme ultraviolet (EUV) radiation source includes a droplet generator configured to generate target droplets of a given material. The droplet generator includes a nozzle configured to supply the target droplets in a space enclosed by a chamber. The target droplet source further includes a sleeve disposed in the chamber distal to the nozzle. The sleeve is configured to provide a path for the target droplets in the chamber. A characteristic of the target droplets along the path provided by the sleeve is substantially unaffected by a variation of environment within the chamber. In one or more of the foregoing and following embodiments, the characteristic of the target droplets is one or more selected from the group consisting of a velocity of the target droplets, a distance between successive target droplets, a frequency of the target droplets, a radius of the target droplets and a shape of the target droplets. In some embodiments, the environment within the chamber includes one or more selected from the group consisting of a pressure inside the chamber, a temperature inside the chamber, a flow rate of gas inside the chamber, and a local pressure at a portion of a space enclosed by the chamber. In some embodiments, the sleeve comprises a tubular body. In an embodiment, the sleeve has a longitudinally tapering cross-section. In an embodiment, the sleeve has a cross-section having a closed shape. In an embodiment, the closed shape is selected from the group consisting of a circle, an ellipse, a triangle, and a regular or irregular convex polygon. In some embodiments, the sleeve is made of stainless steel, a ceramic or a material comprising molybdenum.

According to yet another aspect of the present disclosure, a method of producing target droplets for generating laser produced plasma in an extreme ultraviolet (EUV) radiation source includes generating target droplets of a given material in a droplet generator, supplying the generated target droplets through a nozzle of the droplet generator in a space enclosed by a chamber, and providing a path for the target droplets supplied through the nozzle using a sleeve disposed in the chamber distal to the nozzle. A characteristic of the target droplets along the path provided by the sleeve is substantially unaffected by a variation of environment within the chamber. In one or more of the foregoing and following embodiments, the sleeve includes a tubular body. In an embodiment, the sleeve is made of stainless steel, a ceramic or a material comprising molybdenum. In some embodiments, the characteristic of the target droplets is one or more selected from the group consisting of a velocity of the target droplets, a distance between successive target droplets, a frequency of the target droplets, a radius of the target droplets and a shape of the target droplets.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An extreme ultraviolet (EUV) radiation source comprising:

an EUV generation chamber enclosing a space;

a droplet generator configured to generate target droplets of a given material, the droplet generator comprising a nozzle configured to supply the target droplets in the space enclosed by the EUV generation chamber; and a sleeve disposed in the EUV generation chamber between the nozzle and a focal position, and configured to provide a path for the target droplets between the nozzle and the focal position, wherein the sleeve has a longitudinally tapering cross-section, the sleeve has a cross-section having a closed shape distal to the nozzle and a cross-section having an open shape proximal to the nozzle.

2. The EUV radiation source of claim 1, further comprising an optical device configured to measure a characteristic of the target droplets.

3. The EUV radiation source of claim 2, wherein the sleeve is made of a transparent material for allowing metrology analysis of the target droplets using the optical device, and wherein the transparent material includes at least one of fused quartz and diamond.

4. The EUV radiation source of claim 2, wherein the characteristic of the target droplets is one or more selected from the group consisting of a velocity of the target droplets, a distance between successive target droplets, a frequency of the target droplets, a radius of the target droplets and a shape of the target droplets.

5. The EUV radiation source of claim 1, wherein the sleeve comprises a tubular body.

6. The EUV radiation source of claim 1, wherein the closed shape is selected from the group consisting of a circle, an ellipse, a triangle, and a regular or irregular convex polygon.

7. The EUV radiation source of claim 1, wherein the sleeve is made of a ceramic having an area of enclosed by the cross-section in a range from 5 $cm^2$ to 25 $cm^2$.

8. The EUV radiation source of claim 1, further comprising an excitation laser configured to heat the target droplets supplied by the nozzle to generate plasma, the excitation laser being focused at the focal position in the space enclosed by the EUV generation chamber.

9. A target droplet generator for an extreme ultraviolet (EUV) source, the target droplet source comprising:

a droplet generator configured to generate target droplets of a given material, the droplet generator comprising a nozzle configured to supply the target droplets in a space enclosed by a chamber; and a sleeve disposed in the chamber proximal to the nozzle, the sleeve configured to provide a path for the target droplets in the chamber, wherein the sleeve has a longitudinally tapering cross-section, the sleeve has a cross-section having a closed shape distal to the nozzle and a cross-section having an open shape proximal to the nozzle.

10. The target droplet generator of claim 9, further comprising an optical device embedded within a wall of the sleeve to measure characteristic of the target droplets.

11. The target droplet generator of claim 10, wherein the sleeve is made of a transparent material including at least one of fused quartz and diamond with the optical device.

12. The target droplet generator of claim 9, wherein the sleeve comprises a tubular body.

13. The target droplet generator of claim 9, wherein the closed shape is selected from the group consisting of a circle, an ellipse, a triangle, and a regular or irregular convex polygon.

14. The target droplet generator of claim 9, wherein the chamber includes an environment therewithin, and wherein properties of the environment comprise one or more selected from the group consisting of a pressure inside the chamber, a temperature inside the chamber, a flow rate of gas inside the chamber, and a local pressure at a portion of a space enclosed by the chamber.

15. A method for operating an extreme ultraviolet (EUV) radiation source, the method comprising:

generating target droplets of a given material in a droplet generator through a nozzle of the droplet generator in a space enclosed by a chamber including an environment; and providing the target droplets to a zone of excitation through a sleeve disposed in the chamber proximal to the nozzle, wherein the sleeve has a longitudinally tapering cross-section, the sleeve has a cross-section having a closed shape distal to the nozzle and a cross-section having an open shape proximal to the nozzle.

16. The method of claim 15, further comprising:

monitoring the target droplets by an optical device embedded within a wall of the sleeve to measure a characteristic of the target droplets, wherein the optical device includes one or more optical probes; and performing a removal of contamination by one or more gas outlets in the chamber.

17. The method of claim 16, wherein the characteristic of the target droplets is one or more selected from the group consisting of a velocity of the target droplets, a distance between successive target droplets, a frequency of the target droplets, a radius of the target droplets and a shape of the target droplets.

18. The method of claim 16, wherein the sleeve is made of a transparent material including at least one of fused quartz and diamond with the optical device.

19. The method of claim 15, wherein the sleeve is configured to provide a path for the target droplets between the nozzle and the zone of excitation, and wherein the sleeve comprises a transparent material including at least one of fused quartz and diamond.

20. The method of claim 15, wherein the closed shape is selected from the group consisting of a circle, an ellipse, a triangle, and a regular or irregular convex polygon.

* * * * *